UNITED STATES PATENT OFFICE.

HERMAN GRAF, OF REVAL, RUSSIA, ASSIGNOR TO GEORGE SOMMER, OF REVAL, RUSSIA.

PROCESS OF PREPARING ROSIN SOLUTIONS.

1,099,438.  Specification of Letters Patent.  Patented June 9, 1914.

No Drawing.  Application filed November 18, 1911.  Serial No. 661,166.

*To all whom it may concern:*

Be it known that I, HERMAN GRAF, a subject of the Czar of Russia, and residing at Reval, Russia, have invented a certain new and useful Process of Preparing Rosin Solutions, of which the following is a specification.

This invention relates to the preparation of resin solutions and compounds for use in paper-making.

It has already been proposed, in sizing and impregnating paper, to mix resin intimately with a basic silicate such as water-glass (sodium silicate), the mixture being thereafter acted upon by aluminium sulfate whereby a compound of resin with silica is precipitated.

In the processes heretofore employed for the production of a resin size, resin has been mixed with water-glass by mechanical means forming thereby a solid resin soap and silicon dioxid, which soap, when dissolved in hot water, produced an emulsion of resin soap and silicon dioxid which could thereafter be acted upon by aluminium sulfate, thereby precipitating resin and silicon dioxid. These processes necessitate a multiplicity of operations and are therefore uneconomical and are also objectionable on the ground that the silicon dioxid first separates out as a hydrated silicate and then changes to a fine powder which obstructs and eventually chokes the meshes of the fine sieves used in paper-making.

The present invention relates to an improved process by which a resin sizing solution can be simply prepared and made ready for use, which process can be carried out with the materials cold, *i. e.* at or about atmospheric temperature. As contrasted with the methods of preparation hitherto known, the improved process offers both a technical advantage and more especially an economic advantage, as it dispenses with the heating and any second operation.

Under my invention pulverized resin is mixed with a dilute alkaline solution which results in the formation of an emulsion of resin and alkali. This resin-alkali combination, which, due to the fact that the operations are carried out at a temperature below that at which the alkali or basic salt decomposes, does not, as has hitherto been the case, precipitate silicon dioxid, is poured into the paper pulp or rag engine, where after the aluminium sulfate is added, precipitation takes place and the paper is sized in the mass.

This improved process depends upon the fact that alkaline solutions of a determined specific gravity and at a suitable temperature will combine almost instantaneously with resin, giving a product that can be used for the purpose intended. In the improved process advantage is taken of that phenomenon in the following fashion: I take one part of pulverized resin and mix it by hand, or with a machine, with a quantity of water sufficient to make an emulsion. This emulsion is then mixed with a solution, previously prepared, of 0.2 parts calcined soda in 20 parts of water at a temperature of 14 degrees centigrade. Instead of the calcined soda, an equivalent body, such as some other base or basic salt, may be used. Calcined soda is mentioned in order to show definitely one of the means by which the process can be carried into effect. The bodies brought together and treated according to the indications above re-act on one another in the following fashion: By mixing in the way described, a watery emulsion of resin with a cold alkaline solution, we get no complete chemical combination, but rather an emulsion that is partly a combination and partly a mechanical mixture of the resin with the alkaline body used. The result is that, when this emulsion is precipitated with aluminium sulfate, resinate of aluminium and free resin are precipitated at the same time. Now this free resin is the most essential part of the substance that is used for sizing paper, and it is prepared with cold materials, in the way described. It should further be pointed out that those of the basic salts that decompose at a high temperature, for example water-glass, will combine with resin, if the process above described be adopted, without suffering any decomposition. According to the process above described it is therefore possible to make a real water-glass-resin sizing solution. Some of the combinations hitherto known under that designation are nothing else than soda-resin soaps with an admixture of silicon dioxid.

The water-glass-resin sizing solution is prepared in the following manner:—I take 24 parts of water at 20° centigrade and dissolve therein one part of water-glass (sodium silicate). I then mix with this one part of pulverized resin which almost immediately emulsifies in the alkaline solution. This emulsion of resin and water-glass, which does not as hereinbefore explained, precipitate silicor dioxid, I then pour into the paper pulp and thereafter add aluminium sulfate which precipitates a silicious resinate of aluminium and free resin and thereby sizes the paper in the mass.

The silicious resinate of aluminium and free resin obtained as the final product of this process is an absolutely uniformly constituted homogeneous mass in which the silicon of the water-glass forms a mechanically inseparable part and therefore silicon dioxid is not precipitated in any form and the whole participates in the sizing of the paper.

As will be seen from the preceding description a resin sizing-emulsion is directly produced without previously manufacturing a solid resin soap.

As is apparent from the foregoing, silicon dioxid has an effect in paper sizing only when it is precipitated from a real water-glass-resin sizing solution, as a simple precipitate, while the silicon dioxid obtained from the wrongly named water-glass-resin soap possesses absolutely no sizing qualities.

The water-glass-resin soaps recently introduced, prepared with cold materials, by intimately mixing resin and water-glass, certainly possess the advantage of being real water-glass-resin soaps; but when brought into an aqueous solution, large quantities of silicon dioxid are given off, so that the process now claimed as new, for the direct preparation of hard sizing solution, must be regarded as the only one that is of practical value for industrial purposes.

Having now fully described my invention, what I claim and desire to secure by Letters Patent is:—

1. Process for the preparation of resin sizing solutions for use in paper making consisting in pulverizing resin, in forming an emulsion of the same with water, in mixing said emulsion with a diluted cold alkaline solution, and in adding aluminium sulfate.

2. A process for the preparation of resin sizing solutions for use in paper making consisting in pulverizing resin and forming an emulsion of the same with water, in mixing such emulsion with a diluted cold solution of an alkali which decomposes at a high temperature, and in adding aluminium sulfate.

3. Process for the preparation of resin sizing solutions for use in paper making, consisting in pulverizing resin, in forming an emulsion of the same with water, in mixing said emulsion with water-glass and in adding aluminium sulfate.

In testimony whereof, I affix my signature in the presence of two witnesses.

HERMAN GRAF.

Witnesses:
T. ORLOFF,
H. A. LOVIAGUINE.